(12) United States Patent
Arai (10) Patent No.: US 6,429,621 B1
(45) Date of Patent: Aug. 6, 2002

(54) SOLAR POWER CHARGING SYSTEM

(75) Inventor: Satoshi Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/029,298

(22) Filed: Dec. 28, 2001

(30) Foreign Application Priority Data

Dec. 28, 2000 (JP) ........................................ 2000-401064

(51) Int. Cl.[7] ............................................. H01M 10/46
(52) U.S. Cl. ........................................................ 320/101
(58) Field of Search ................................. 320/101, 128, 320/135, 137; 323/906; 136/243, 291, 293

(56) References Cited

U.S. PATENT DOCUMENTS 4,434,398 A * 2/1984 Higuchi
5,493,155 A * 2/1996 Okamoto et al.

FOREIGN PATENT DOCUMENTS

| EP | 0 628 901 A2 | 12/1994 |
|---|---|---|
| JP | 9-292851 | 11/1997 |
| JP | 10-66281 | 3/1998 |
| JP | 2 2771096 | 4/1998 |

* cited by examiner

*Primary Examiner*—Edward H. Tso
(74) *Attorney, Agent, or Firm*—Young & Thompson (57) ABSTRACT

A solar power charging system comprising: a voltage converter for converting a voltage level of all original voltage generated by a solar battery into generate a charging voltage and for charging a capacitor by the charging voltage; and a duty ratio control circuit electrically coupled to the voltage converter for supplying a driving clock to the voltage converter for allowing the voltage converter to operate based on the driving clock, wherein the duty ratio control circuit adjusts a duty ratio of the driving clock based on a maximum charge power which depends on the original voltage generated by the solar battery.

6 Claims, 9 Drawing Sheets

———— voltage-current characteristic curve at maximum charge power

— — — — preset approximated line

FIG. 8

2A: voltage converter circuit

SOLAR POWER CHARGING SYSTEM

BACKGROUND OF THE INVENTION

1. Field of the Invention

The present invention relates to a solar power charging system, and more particularly to a solar power charging system for charging a power generated from a solar battery into an electric double layer capacitor at a high efficiency.

2. Description of the Related Art

Advanced power systems integrate the solar power charging system which includes the solar battery and the electric double layer capacitor, so that a power is generated during the daytime and the generated power is consumed in the night in order to respond to environmental and energy requirements. This solar system is, for example, disclosed in Japanese laid-open patent publication No. 10-66281. It is important for the solar power charging system to increase the efficiency of supplying the generated power to the capacitor.

Figure 1A:
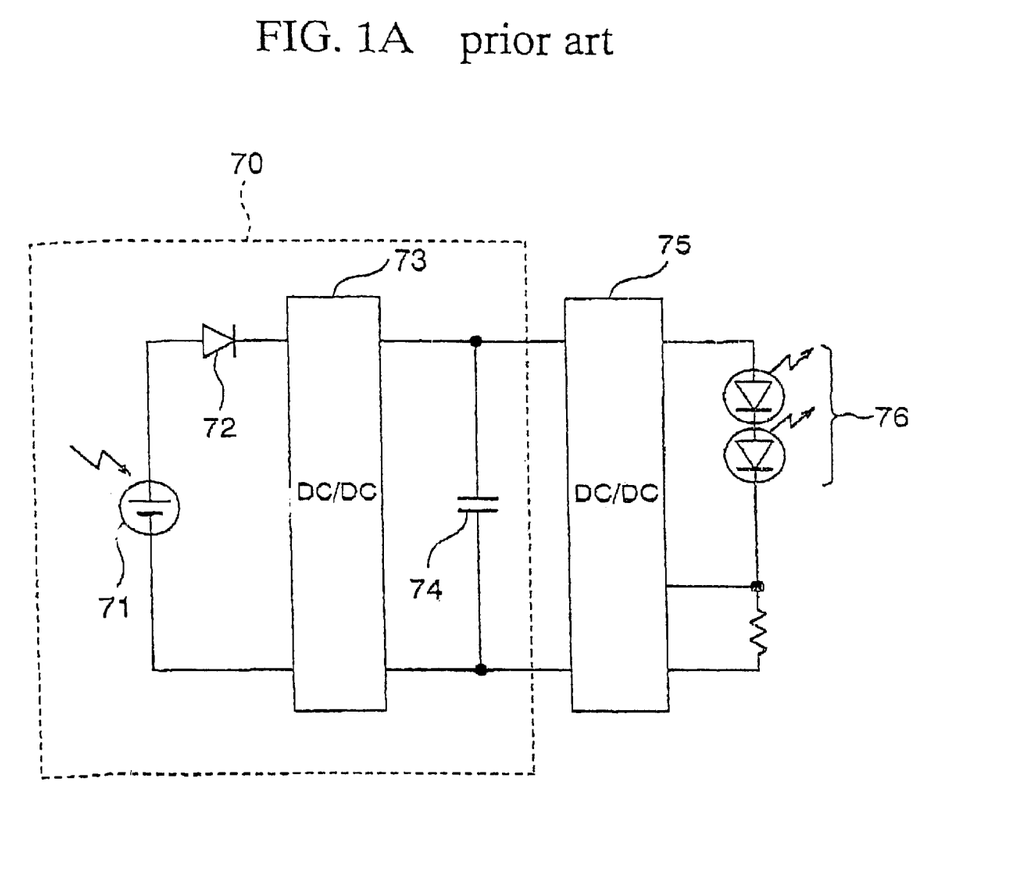
FIG. 1A is a block diagram illustrative of a power system including a conventional solar power charging system.
Figure 1B:
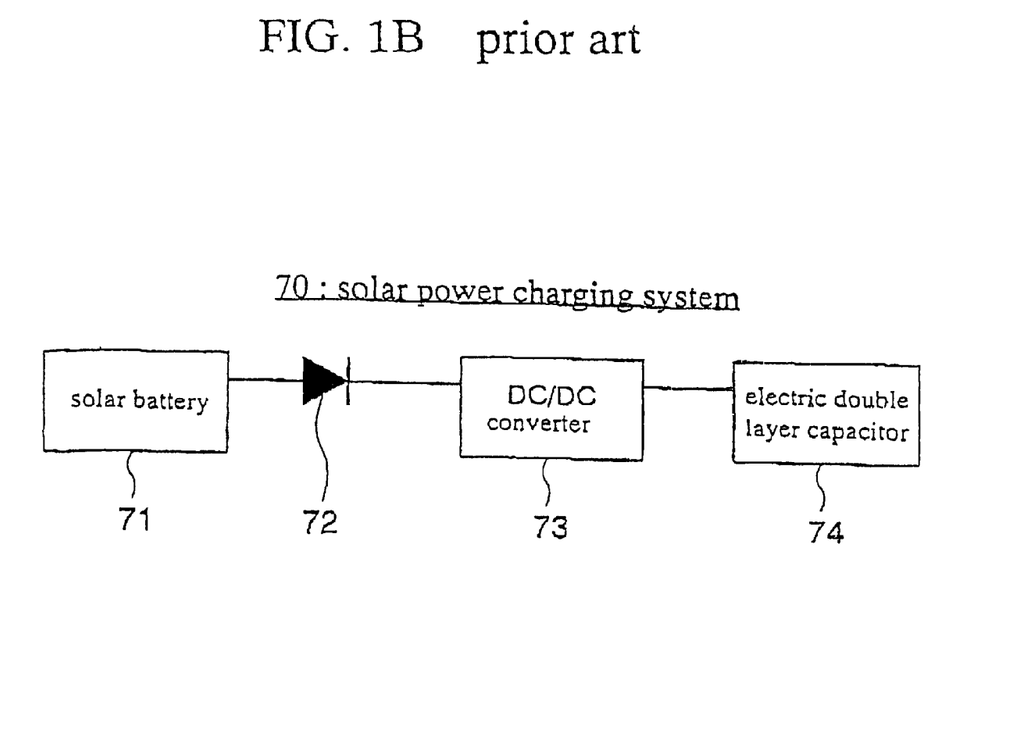
FIG. 1B is a block diagram illustrative of the conventional solar power charging system shown in FIG. 1A.

FIG. 1A is a block diagram illustrative of a power system including a conventional solar power charging system. FIG. 1B is a block diagram illustrative of the conventional solar power charging system shown in FIG. 1A. This conventional power system is also disclosed in Japanese laid-open patent publication No. 9-292851. A conventional solar power charging system 70 includes a solar battery 71, a rectifier 72 such as a diode, a first DC-DC converter 73, and an electric double layer capacitor 74. The conventional solar power charging system 70 is connected to a second DC-DC converter 75. The second DC-DC converter 75 is connected to an indicator 76. The solar power charging system 70 stores a power. The second DC-DC converter 75 receives the power from the solar power charging system 70 and converts the voltage of the power. The power with the converted voltage is supplied to the indicator 76 for indicating the converted voltage level of the power.

With reference to FIG. 1B, the power voltage is supplied from the solar battery 71 through the rectifier 72 to the first DC-DC converter 73. The power voltage generated by the solar battery 71 varies depending on sunshine conditions. The first DC-DC converter 73 converts the variable power voltage into a predetermined constant voltage level. The power with the predetermined constant voltage level is then supplied from the first DC-DC converter 73 to the electric double layer capacitor 74, so that the electric double layer capacitor 74 is charged at the predetermined constant voltage level.

Charging the capacitor at the constant voltage level means that about a half of the generated power from the solar battery can theoretically be charged to the capacitor. This means that as long as the capacitor is charged at the constant voltage level, the efficiency of charging the capacitor is low.

The solar battery has a maximum power condition based on a variable generated power voltage level. The maximum power condition depends on a relationship between voltage and current from the solar battery. The method of charging the capacitor at the predetermined constant voltage level is incapable of satisfying the maximum power condition.

In the above circumstances, the development of a novel solar power charging system free from the above problems is desirable.

SUMMARY OF THE INVENTION

Accordingly, it is an object of the present invention to provide a novel solar power charging system free from the above problems.

It is a further object of the present invention to provide a novel solar power charging system capable of charging a capacitor under the maximum power condition.

The present invention provides a solar power charging system comprising: a voltage converter for converting a voltage level of an original voltage generated by a solar battery into generate a charging voltage and for charging a capacitor by the charging voltage; and a duty ratio control circuit electrically coupled to the voltage converter for supplying a driving clock to the voltage converter for allowing the voltage converter to operate based on the driving clock, wherein the duty ratio control circuit adjusts a duty ratio of the driving clock based on a maximum charge power which depends on the original voltage generated by the solar battery.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A first aspect of the present invention is a solar power charging system comprising: a voltage converter for converting a voltage level of an original voltage generated by a solar battery into generate a charging voltage and for charging a capacitor by the charging voltage; and a duty ratio control circuit electrically coupled to the voltage converter for supplying a driving clock to the voltage converter for allowing the voltage converter to operate based on the driving clock, wherein the duty ratio control circuit adjusts a duty ratio of the driving clock based on a maximum charge power which depends on the original voltage generated by the solar battery.

The duty ratio of the driving clock is controlled based on the maximum charge power which is decided by the generated voltage, whereby the capacitor can be charged at the maximum output of the solar battery, wherein the maximum output may vary depending on the sunshine conditions.

It is preferable that the voltage converter circuit generates a detected voltage, and the duty ratio control circuit receives a detected voltage, and the ratio control circuit adjusts the duty ratio based on the detected voltage in addition to the maximum charge power.

It is also preferable that the duty ratio control circuit adjusts the duty ratio in accordance with a preset approximated line which is approximated with reference to a voltage-current characteristic curve of a maximum charging power of the solar battery.

It is also preferable that the voltage converter is capable of rising the voltage level of the original voltage generated by the solar battery.

It is also preferable that the voltage converter is capable of both rising falling the voltage level of the original voltage generated by the solar battery.

It is also preferable that the capacitor comprises an electric double layer capacitor.

First Embodiment

Figure 2:
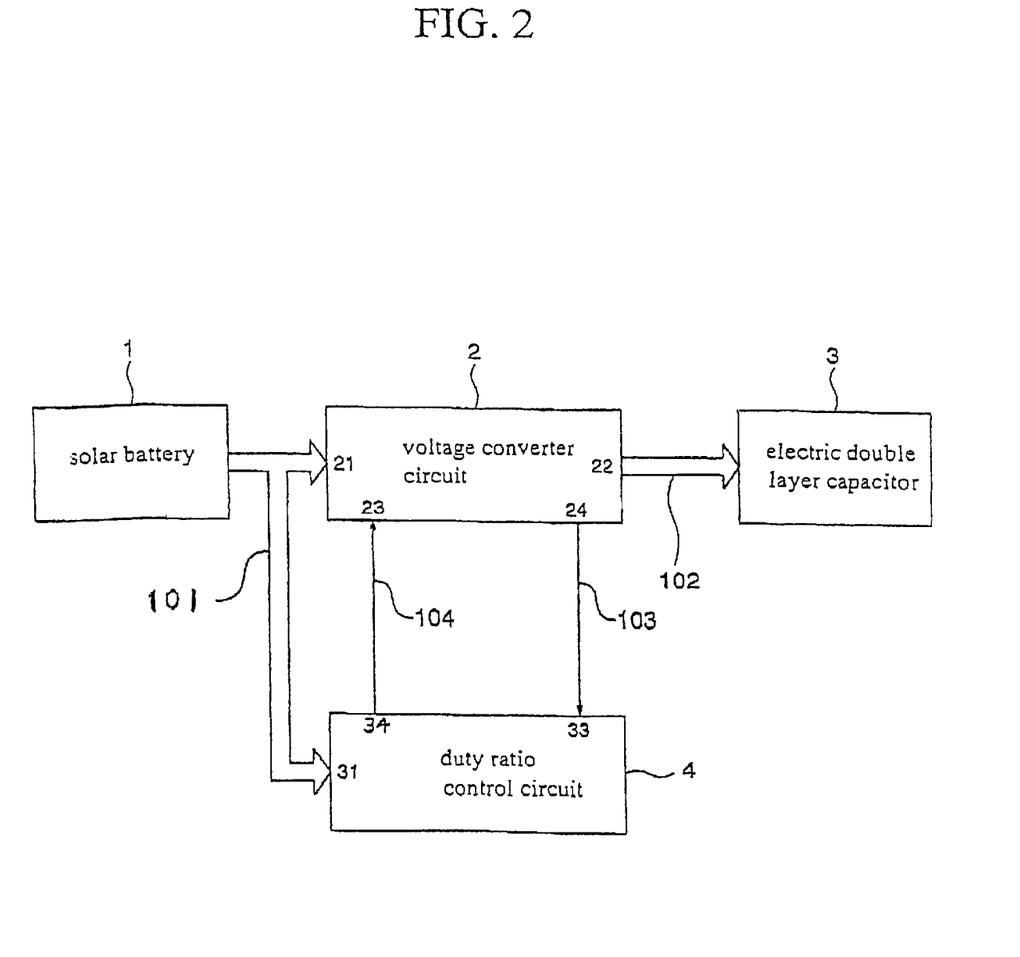
FIG. 2 is a block diagram illustrative of a novel solar power charging system in a first embodiment in accordance with the present invention.

A first embodiment according to the present invention will be described in detail with reference to the drawings. FIG. 2 is a block diagram illustrative of a novel solar power charging system in a first embodiment in accordance with the present invention.

A solar power charging system includes a solar battery 1, a voltage converter circuit 2, an electric double layer capacitor 3 and a duty ratio control circuit 4. The solar battery 1 generates a generated voltage 101 upon receipt of incident light or sunshine. The solar battery 1 is electrically coupled to a power input terminal 21 of the voltage converter circuit 2 for supplying the generated voltage 101 to the voltage converter circuit 2. The solar battery 1 is electrically coupled to a power input terminal 31 of the duty ratio control circuit 4 for supplying the generated voltage 101 to the duty ratio control circuit 4.

A current inputted into the voltage converter circuit 2 is much larger than a current inputted into the duty ratio control circuit 4. A majority of the generated power by the solar battery 1 is consumed by the voltage converter circuit 2, whilst a remaining minority of the generated power by the solar battery 1 is consumed by the duty ratio control circuit 4.

The voltage converter circuit 2 has a detected voltage output terminal 24. The voltage converter circuit 2 receives the current from the solar battery 1 and generates a detected voltage 103 based on the received current, so that the detected voltage 103 is outputted from the detecting voltage output terminal 24 of the voltage converter circuit 2. The detected voltage output terminal 24 of the voltage converter circuit 2 is electrically coupled to a detected voltage input terminal 33 of the duty ratio control circuit 4, so that the detected voltage 103 is inputted through the detected voltage input terminal 33 into the duty ratio control circuit 4.

The voltage converter circuit 2 has a driving clock input terminal 23. The duty ratio control circuit 4 has a driving clock output terminal 34 which is electrically coupled to the driving clock input terminal 23. The duty ratio control circuit 4 controls a duty ratio of a driving clock and generates a driving clock 104 with the controlled duty ratio based on the generated voltage 101 and the detected voltage 103. The driving clock 104 with the controlled duty ratio is outputted from the driving clock output terminal 34 and then inputted through the driving clock input terminal 23 into the voltage converter circuit 2. The voltage converter circuit 2 operates, in synchronizing with the driving clock 104, to convert the generated voltage 101 into a charge voltage 102. The voltage converter circuit 2 has a charge voltage output terminal 22, so that the charge voltage 102 is outputted from the charge voltage output terminal 22. This charge voltage 102 output terminal 22 of the voltage converter circuit 2 is electrically coupled to the electric double layer capacitor 3, so that the charge voltage 102 is supplied to the electric double layer capacitor 3, whereby the electric double layer capacitor 3 is charged by the charge voltage 102.

The electric double layer capacitor 3 stores a power supplied through the voltage converter circuit 2 from the solar battery 1. The electric double layer capacitor 3 is longer in life-time of charge/discharge times than a chemical secondary battery.

Figure 3:
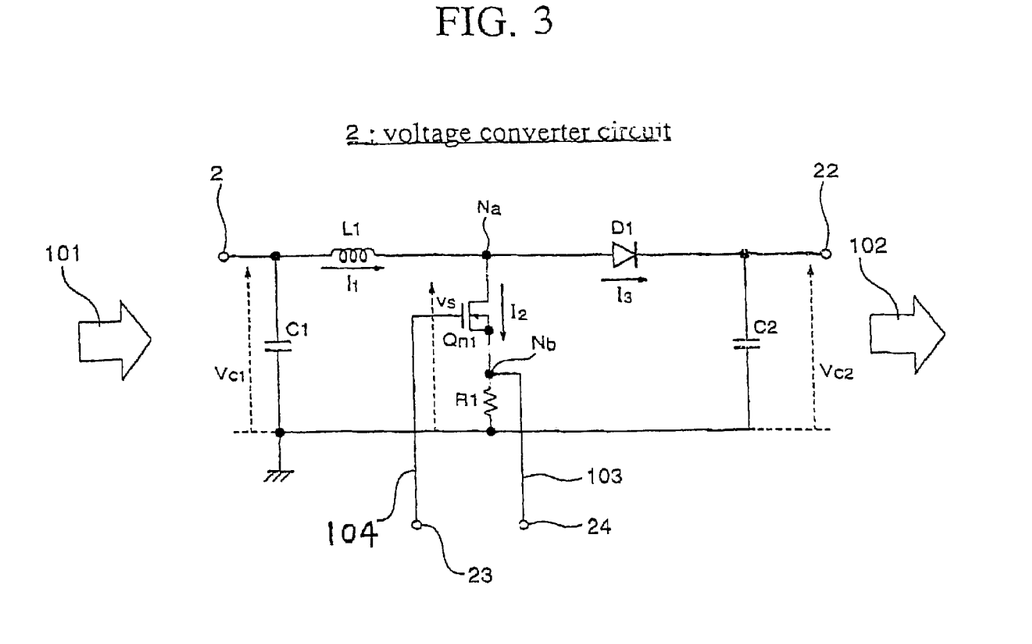
FIG. 3 is a circuit diagram illustrative of an internal circuit configuration of the voltage converter circuit included in the solar power charging system shown in FIG. 2.

FIG. 3 is a circuit diagram illustrative of an internal circuit configuration of the voltage converter circuit included in the solar power charging system shown in FIG. 2. The voltage converter circuit 2 may comprise a DC chopper circuit of boosting type as shown in FIG. 3. The voltage converter circuit 2 has capacitors C1 and C2, an inductor L1, a diode D1, an n-channel transistor Qn1, and a resistance R1. The voltage converter circuit 2 also has the power input terminal 21, the charge voltage output terminal 22, the driving clock input terminal 23, and the detected voltage output terminal 24.

The power input terminal 21 is connected through the capacitor C1 to a ground. The power input terminal 21 is connected through the inductor L1 to a node Na. The node Na is connected through the n-channel transistor Qn1 to a node Nb. The node Nb is also connected through the resistance R1 to the ground. The node Nb is connected directly to the detected voltage output terminal 24, from which the detected voltage 103 is outputted. A gate of the n-channel transistor Qn1 is connected directly to the driving clock input terminal 23 for applying the driving clock 104 to the gate of the n-channel transistor Qn1.

The node Na is also connected through the diode D1 to the charge voltage output terminal 22. The charge voltage output terminal 22 is connected through the capacitor C2 to the ground.

Figure 4:
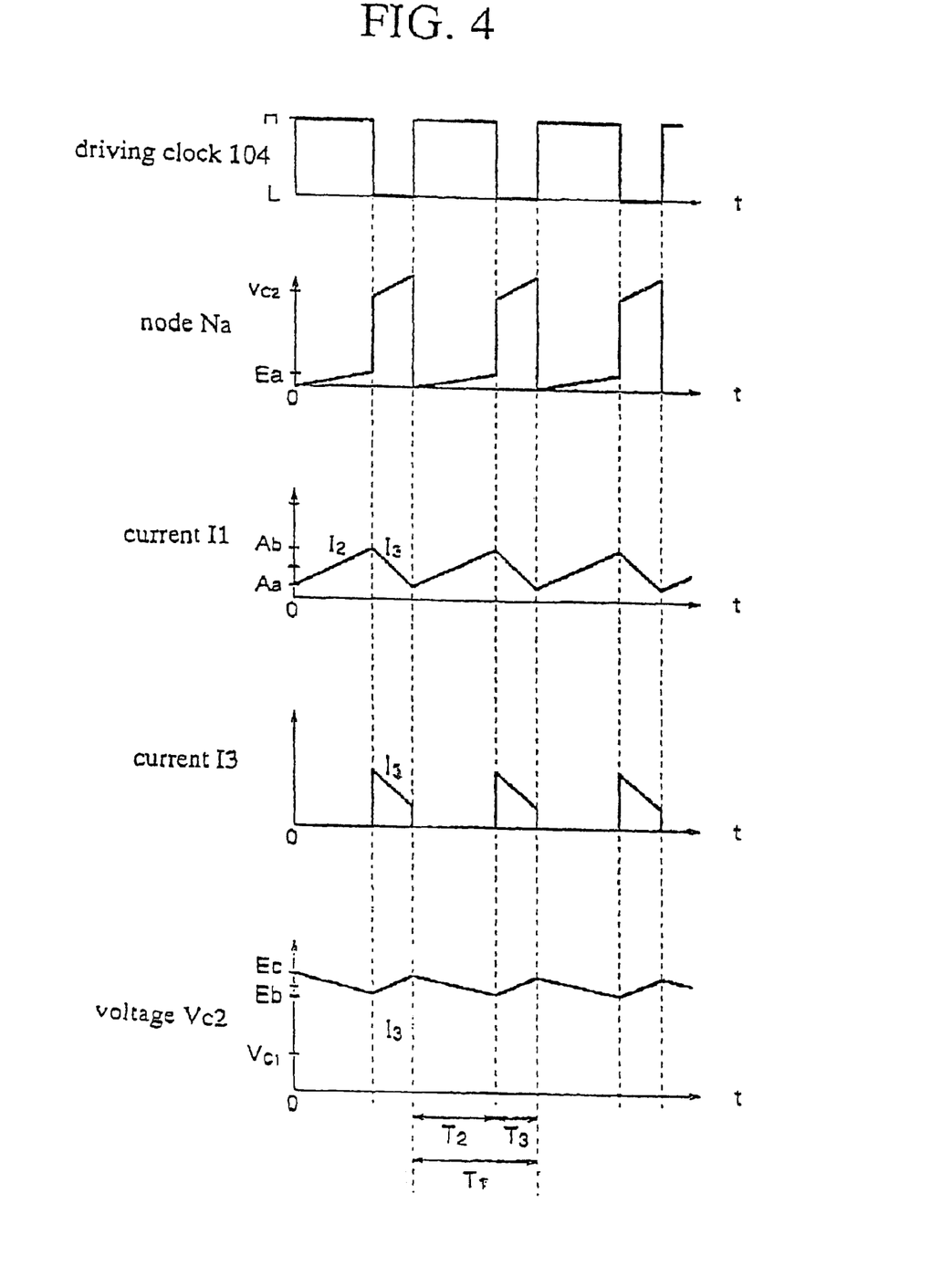
FIG. 4 is a timing chart illustrative of waveforms of driving clock signal. voltage at the node Na, currents I1 and I3, and voltage Vc2 of the voltage converter circuit of FIG. 3.

FIG. 4 is a timing chart illustrative of waveforms of driving clock signal, voltage at the node Na, currents I1 and I3, and voltage Vc2 of the voltage converter circuit of FIG. 3. The inductor L1 has a current I1 which flows in a direction from the power input terminal 21 toward the node Na. The n-channel transistor Qn1 has a current I2 which flows in a direction from the node Na to the node Nb. The diode D1 has a current I3 which flows a direction from the node Na to the charge voltage output terminal 22. The capacitor C1 has a voltage Vc1. The capacitor C2 has a voltage Vc2.

The driving clock 104 has a cycle T1 which comprises an ON-time period T2 and an OFF-time period T3. In the ON-time period T2, the driving clock 104 is in high level "H". In the OFF-time period T3, the driving clock 104 is in low level "L". The n-channel transistor Qn1 is placed in ON-state during the ON-time period T2, because the driving clock 104 is in high level "H". The n-channel transistor Qn1 is placed in OFF-state during the OFF-time period T3, because the driving clock 104 is in low level "L".

In the ON-time period T2, the n-channel transistor Qn1 is placed in ON-state, whereby the node Na has the ground potential, and the diode D1 is biased in reverse direction, and the current I3 is zero. The capacitor C2 is discharged to supply a charge current to the electric double layer capacitor, whereby the voltage Vc2 of the capacitor C2 almost linearly decreases from a high voltage level Ec to a low voltage level Eb.

Since the n-channel transistor Qn1 is placed in ON-state, then a current flows through a closed circuit which comprises the inductor L1, the n-channel transistor Qn1, and the resistance R1, wherein the current I1 is equal to the current I2. The current I1 almost linearly increases from a low current value Aa to a high current value Ab.

The node Nb has a potential Vb which is given by Vb=I2×R1. The node Nb has the same potential as the node Na. The detected voltage 103 is the potential of the node Nb, for which reason the detected voltage 103 has the voltage level equal to the potential of the node Na. The voltage level of the detected voltage 103 almost linearly increases from 0 to the high level Ea. The inductor L1 increases in an internal magnetic flux.

In the OFF-time period T3, the n-channel transistor Qn1 is placed in the OFF-state, whereby the node Na and the node Nb are electrically separated. The inductor L1 decreases in the internal magnetic flux, whereby an induced electromotive force is caused by the inductor L1 to suppress the decrease in the internal magnetic flux of the inductor L1. The generated induced electromotive force and the voltage Vc1 of the capacitor C1 are applied to the node Na, whereby the node Na has an increased potential Vc2 which is higher than Vc1. The increased potential Vc2 of the node Na applies a forward bias to the diode D1.

Since the n-channel transistor Qn1 is placed in OFF-state, then another current flows through another closed circuit which comprises the capacitor C1, the inductor L1, the diode D1 and the capacitor C2, wherein the current I1 is equal to the current I3. The capacitor C2 is charged, whereby the current I1 almost linearly decreases from the high current value Ab to the low current value Aa.

Figure 5:
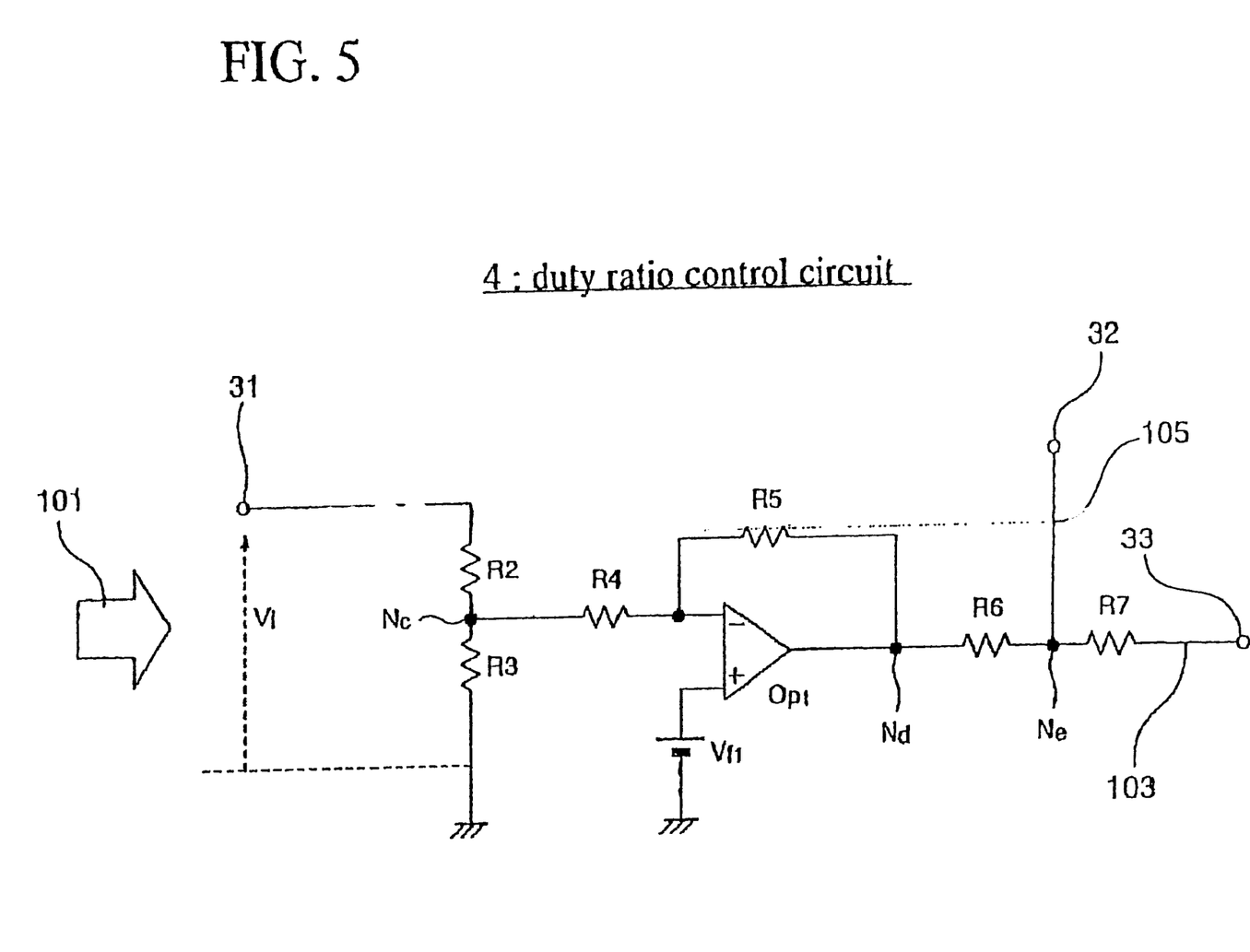
FIG. 5 is a circuit diagram illustrative of an internal circuit configuration of the duty ratio control circuit included in the solar power charging system shown in FIG. 2.

FIG. 5 is a circuit diagram illustrative of an internal circuit configuration of the duty ratio control circuit included in the solar power charging system shown in FIG. 2. The duty ratio control circuit 4 has resistances R2, R3, R4, R5, R6 and R7, an operational amplifier Op1, and a reference voltage Vf1. The duty ratio control circuit 4 also has the power input terminal 31, a control output terminal 32, the detected voltage input terminal 33, and the driving clock output terminal 34.

The power input terminal 31 is connected through the resistance R2 to a node Nc. The node Nc is connected through the resistance R3 to a ground. The node Nc is connected through the resistance R4 to an inversion input terminal of the operational amplifier Op1. A non-inversion input terminal of the operational amplifier Op1 is connected through the reference voltage Vf1 to the ground. An output terminal of the operational amplifier Op1 is connected to a node Nd. The node Nd is connected through the resistance R5 to the inversion input terminal of the operational amplifier Op1. The node Nd is connected through the resistance R6 to a node Ne. The node Ne is connected directly to the control output terminal 32. The node Ne is connected through the resistance R7 to the detected voltage input terminal 33. The control output terminal 32 is connected through the resistance R7 to the detected.voltage input terminal 33.

The duty ratio control circuit 4 has a driving clock generator circuit which is not shown in FIG. 5, wherein the driving clock generator circuit is connected to the control output terminal 32. A clock control voltage 105 is supplied through the control output terminal 32 to the driving clock generator circuit.

The node Nc has a potential Vc given by:

$$Vc=R3/(R2+R3)Vi \quad (1)$$

where Vi is the voltage of the generated voltage 101 generated by the solar battery 1.

The operational amplifier Op1 performs an inversion amplification of the potential Vc by a potential difference from the reference voltage Vf1.

The node Nd has a potential Vd given by:

$$Vd=\{(R4+R5)/R4\}Vf1-(R5/R4)Vi \quad (2)$$

In the voltage converter circuit 2, the potential Vb of the node Nb is generated in proportion to the current I2 flowing through the n-channel transistor Qn1. The potential Vb is supplied as the detected voltage 103 from the detected voltage output terminal 24 to the detected voltage input terminal 33 of the duty ratio control circuit 4, whereby the potential Ve is generated at the node Ne.

$$Ve=(Vb-Vd)\times R6/(R6+R7) \quad (3)$$

The duty ratio control circuit 4 supplies the potential Ve as the clock control voltage 105 to the driving clock generator circuit, so that the driving clock generator circuit controls the duty ratio based on the clock control voltage 105 to generate the driving clock 104.

The driving clock generator recognizes the current I1 based on the clock control voltage 105 with the potential Ve. The upper limit Ab and the lower limit Aa have previously been set so that an averaged value of the current I1 corresponds to an input current such that the solar battery provides the maximum charge power to obtain the maximum output. The driving clock generator circuit controls the duty ratio of the driving clock 104 based on the variation of he current I1.

The driving clock 104 is set high level, and the driving clock generator circuit monitors the current I1. If the current I1 exceeds the upper limit Ab, then the driving clock generator circuit sets the driver clock 104 at the low level, whereby the driving clock generator circuit counts a time. If the time passes a predetermined value, then the driving clock generator circuit sets the driver clock 104 at the high level.

The duty ratio control circuit 4 recognizes, based on the generated voltage 101 and the detected voltage 103, a power consumed by the voltage converter circuit 2 to generate a clock control voltage 105 with a controlled duty ratio.

Figure 6:
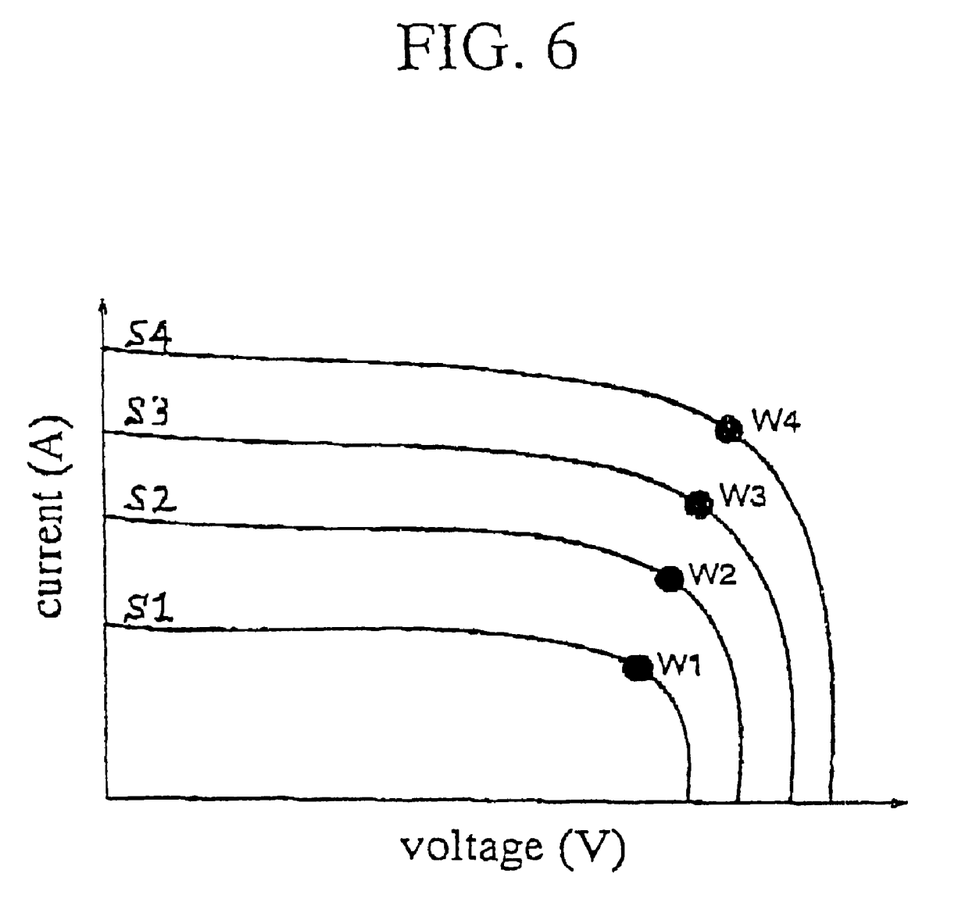
FIG. 6 is a diagram illustrative of a voltage-current characteristic curve of the solar battery.

FIG. 6 is a diagram illustrative of a voltage-current characteristic curve of the solar battery. The voltage-current characteristic is measured based on four illuminances, S1, S2, S3 and S4. The solar battery shows respective maximum powers W1, W2, W3 and W4, at the four illuminances S1, S2, S3 and S4. The illuminance is largely variable depending on the sunshine condition. The maximum power of the solar battery largely depends on the illuminance.

Figure 7:
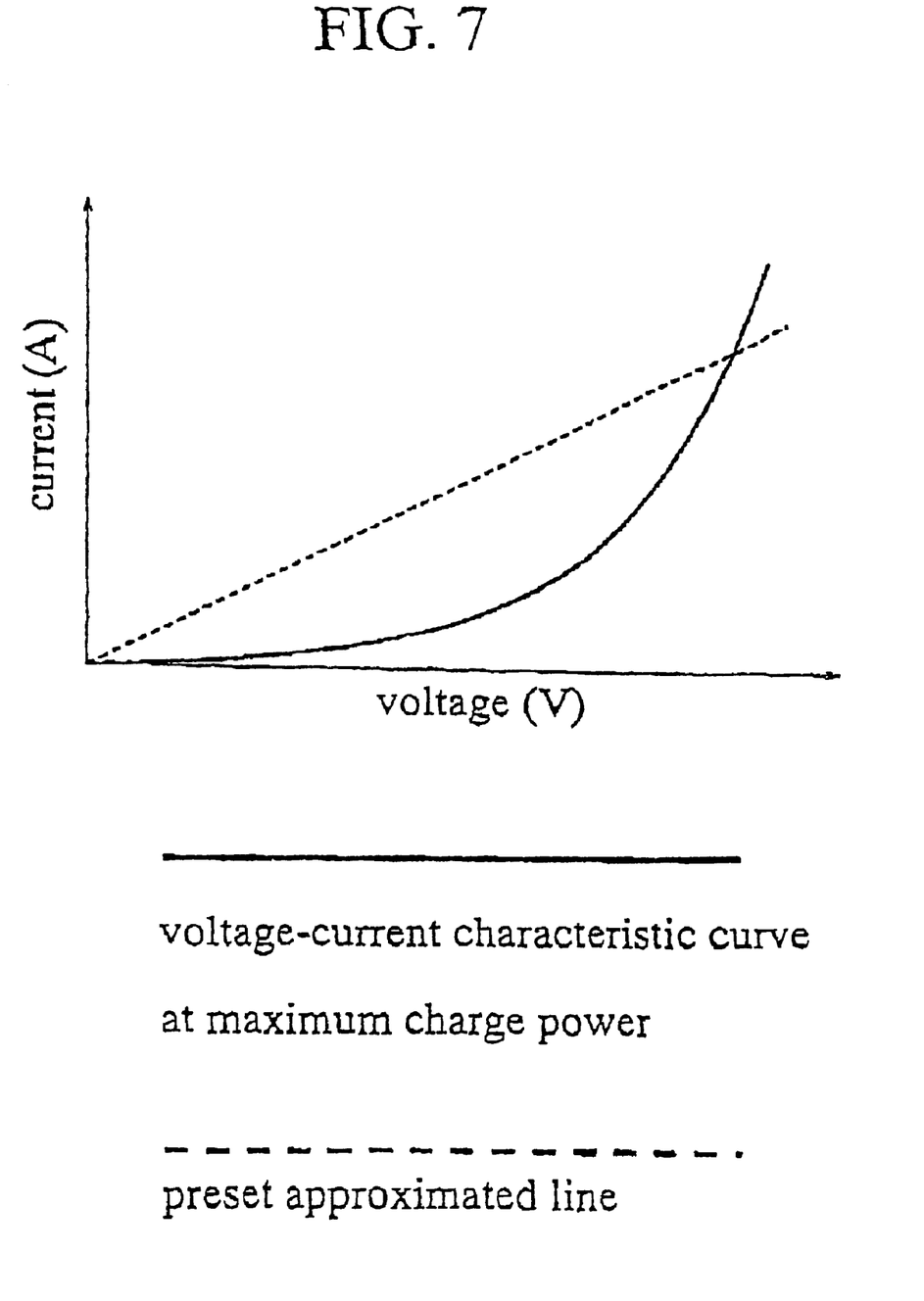
FIG. 7 is a diagram illustrative of variation in power under maximum power conditions over the illuminance.

FIG. 7 is a diagram illustrative of variation in power under maximum power conditions over the illuminance. A real line represents the characteristic curve of the power under maximum power conditions. A broken line represents a preset approximate linear line in accordance with the characteristic curve at the maximum power. The characteristic curve of the maximum output is given by the four points of the maximum output powers W1, W2, W3 and W4. The approximate line is obtained by assuming that the voltage and the current have a proportional relationship under the maximum output conditions.

As described above, the duty ratio control circuit 4 has the driving clock generator circuit which is not shown. The clock control voltage is inputted through an input terminal into the driving clock generator circuit of the duty ratio control circuit 4. The solar battery 1 supplies the maximum output power to a load when the current of the maximum output flows through the load upon application of the generated voltage 101. The current of the maximum output represents a crossing point to the generated voltage 101 on the characteristic curve of the maximum output.

The driving clock generator circuit of the duty ratio control circuit 4 controls the ON-time period T2 of the driving clock 104 based on the potential Ve of the clock control voltage 105. The voltage converter circuit 2 consumes the current I1 which comprises the current I2 and the current I3.

The majority of the power supplied from the solar battery 1 is consumed by the voltage converter circuit 2. The duty ratio control circuit 4 controls the voltage converter circuit 2 so that the consumed power moves on the approximate linear line.

In accordance with the embodiment, the duty ratio of the driving clock is controlled based on the maximum charge power which is decided by the generated voltage, whereby the capacitor can be charged at the maximum output of the solar battery, wherein the maximum output may vary depending on the sunshine conditions.

Second Embodiment

Figure 8:
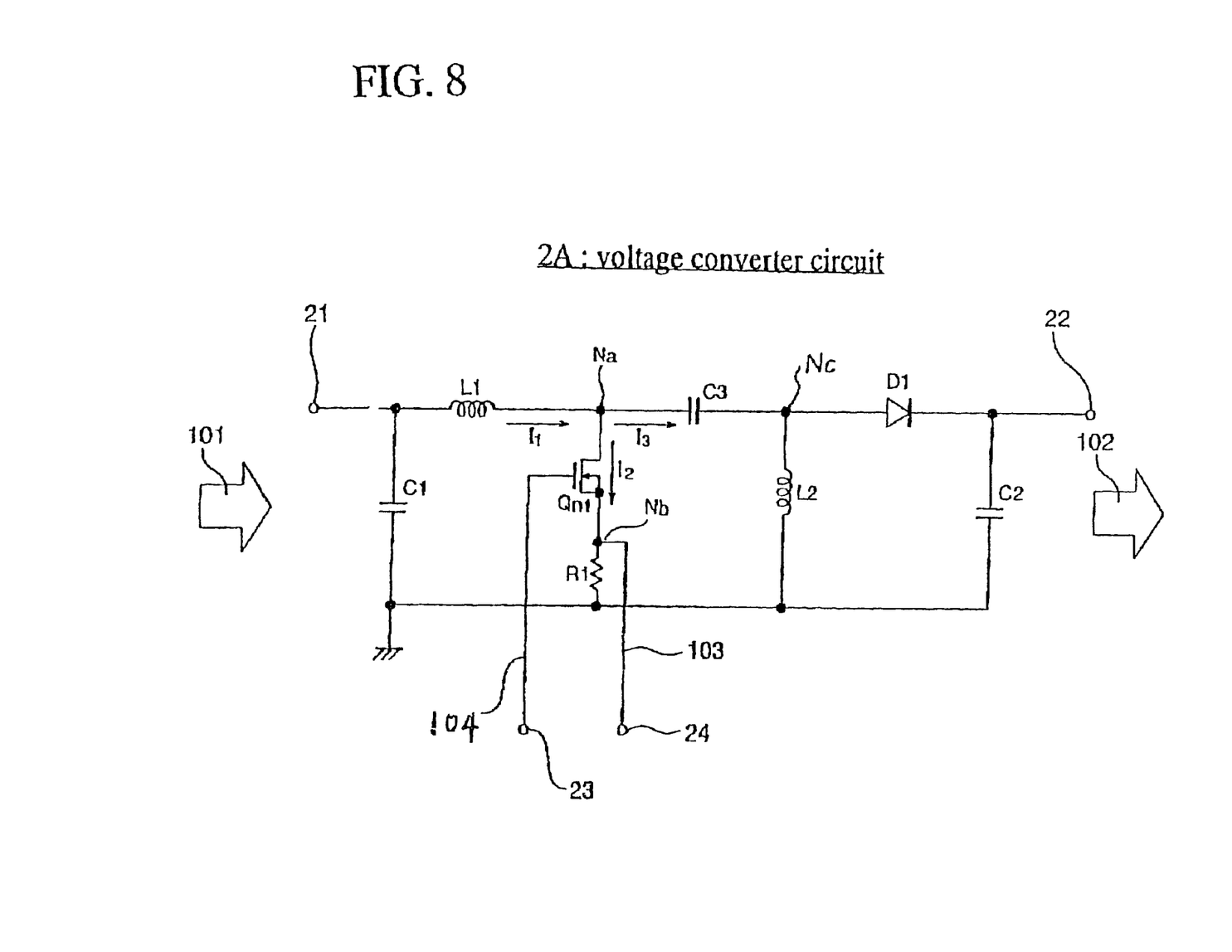
FIG. 8 is a circuit diagram illustrative of an internal circuit configuration of other voltage converter circuit included in the solar power charging system in a second embodiment in accordance with the present invention.

A second embodiment according to the present invention will be described in detail with reference to the drawings. FIG. 8 is a circuit diagram illustrative of an internal circuit configuration of other voltage converter circuit included in the solar power charging system in a second embodiment in accordance with the present invention. The second embodiment is different from the first embodiment only in the circuit configuration of the voltage converter circuit.

The voltage converter circuit 2A may comprise a DC chopper circuit of boosting-up-and-down type. The voltage converter circuit 2A has capacitors C1, C2 and C3, inductors L1 and L2, a diode D1, an n-channel transistor Qn1, and a resistance R1. The voltage converter circuit 2A also. has the power input terminal 21, the charge voltage output terminal 22, the driving clock input terminal 23, and the detected voltage output terminal 24.

The power input terminal 21 is connected through the capacitor C1 to a ground. The power input terminal 21 is connected through the inductor L1 to a node Na. The node Na is connected through the n-channel transistor Qn1 to a node Nb. The node Nb is also connected through the resistance R1 to the ground. The node Nb is connected directly to the detected voltage output terminal 24, from which the detected voltage 103 is outputted. A gate of the n-channel transistor Qn1 is connected directly to the driving clock input terminal 23 for applying the driving clock 104 to the gate of the n-channel transistor Qn1.

The node Na is also connected through the capacitor C3 to a node Nc. The node Nc is connected through the inductor L2 to the ground. The node Nc is also connected through the diode D1 to the charge voltage output terminal 22. The charge voltage output terminal 22 is connected through the capacitor C2 to the ground.

The voltage converter circuit 2A adjusts the generated voltage 101 with rising or falling the voltage level to generate the charge voltage 102. Since the voltage converter circuit 2A is capable of both rising and falling the voltage level of the generated voltage 101, this increases acceptable ranges of the generated voltage 101 and the charge voltage 102, whereby the conditions for selecting the solar battery 1 and the electric double layer capacitor 3.

In accordance with the embodiment, the duty ratio of the driving clock is controlled based on the maximum charge power which is decided by the generated voltage, whereby the capacitor can be charged at the maximum output of the solar battery, wherein the maximum output may vary depending on the sunshine conditions.

It is possible as a modification to the foregoing embodiments that a microcomputer is integrated into the duty ratio control circuit 4 for changing the circuit type of the voltage converter circuit, whereby the input current at the maximum output from the generated voltage 101 can be found under the control of the microcomputer.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A solar power charging system comprising:

a voltage converter for converting a voltage level of an original voltage generated by a solar battery into generate a charging voltage and for charging a capacitor by said charging voltage; and a duty ratio control circuit electrically coupled to said voltage converter for supplying a driving clock to said voltage converter for allowing said voltage converter to operate based on said driving clock, wherein said duty ratio control circuit adjusts a duty ratio of said driving clock based on a maximum charge power which depends on said original voltage generated by said solar battery.

2. The solar power charging system as claimed in claim 1, wherein said voltage converter circuit generates a detected voltage, and said duty ratio control circuit receives a detected voltage, and said ratio control circuit adjusts said duty ratio based on said detected voltage in addition to said maximum charge power.

3. The solar power charging system as claimed in claim 1, wherein said duty ratio control circuit adjusts said duty ratio in accordance with a preset approximated line which is approximated with reference to a voltage-current characteristic curve of a maximum charging power of said solar battery.

4. The solar power charging system as claimed in claim 1, wherein said voltage converter is capable of rising said voltage level of said original voltage generated by said solar battery.

5. The solar power charging system as claimed in claim 1, wherein said voltage converter is capable of both rising falling said voltage level of said original voltage generated by said solar battery.

6. The solar power charging system as claimed in claim 1, wherein said capacitor comprises an electric double layer capacitor.

* * * * *